US010037709B2

(12) United States Patent
Hamming et al.

(10) Patent No.: US 10,037,709 B2
(45) Date of Patent: Jul. 31, 2018

(54) METHOD, SYSTEM AND COMPUTER PROGRAM FOR DECISION SUPPORT

(71) Applicant: THALES NEDERLAND B.V., Hengelo (NL)

(72) Inventors: Jan-Egbert Hamming, Enschede (NL); Frank Koudijs, Oldenzaal (NL); Frank Colijn, Hengelo (NL); Pim Van Wensveen, Hengelo (NL)

(73) Assignee: THALES NEDERLAND B.V., Hengelo (NL)

( * ) Notice: Subject to any disclaimer, the term of this patent is extended or adjusted under 35 U.S.C. 154(b) by 76 days.

(21) Appl. No.: 15/102,258

(22) PCT Filed: Dec. 8, 2014

(86) PCT No.: PCT/EP2014/076910
§ 371 (c)(1),
(2) Date: Jun. 6, 2016

(87) PCT Pub. No.: WO2015/091065
PCT Pub. Date: Jun. 25, 2015

(65) Prior Publication Data
US 2016/0300504 A1 Oct. 13, 2016

(30) Foreign Application Priority Data

Dec. 18, 2013 (EP) .................................. 13198152

(51) Int. Cl.
*G06K 9/00* (2006.01)
*G09B 9/00* (2006.01)
(Continued)

(52) U.S. Cl.
CPC ............ *G09B 9/003* (2013.01); *G06K 9/469* (2013.01); *G06Q 10/06* (2013.01); *G06T 7/11* (2017.01);
(Continued)

(58) Field of Classification Search
CPC combination set(s) only.
See application file for complete search history.

(56) References Cited

U.S. PATENT DOCUMENTS 5,706,417 A * 1/1998 Adelson ................. G06T 9/00
345/474
6,195,609 B1 * 2/2001 Pilley .................... G01C 23/00
342/36
(Continued)

OTHER PUBLICATIONS

J. D. Hicks et al., "Eyekon: Augmented Reality for Battlefield Soldiers," Proceedings of the 27th Annual NASA Goddard/IEEE Software Engineering Workshop, Dec. 5, 2002, pp. 156-163, XP010639845.

*Primary Examiner* — Anand Bhatnagar
(74) *Attorney, Agent, or Firm* — Baker & Hostetler LLP

(57) ABSTRACT

A decision support method for use by an operator surrounded by adverse entities in a battlefield environment comprises generating a layered representation of the physical environment surrounding the operator from sensor information by mapping the spherical physical environment of the operator into a geometrical representation suitable for display on a screen, the representation being segmented into a plurality of layers having respective sizes, each layer being associated with a respective category of tactical actions. The representation further comprises visual elements representing adverse entities in the surrounding physical environment of the operator, each visual element being represented so as to be superposed with a given layer.

8 Claims, 4 Drawing Sheets

(51) Int. Cl.
*G06Q 10/06* (2012.01)
*G06K 9/46* (2006.01)
*G06T 7/11* (2017.01)

(52) U.S. Cl.
CPC ............... *G06T 2207/30212* (2013.01); *G06T 2207/30241* (2013.01)

(56) References Cited

U.S. PATENT DOCUMENTS

| | | | | |
|---|---|---|---|---|
| 8,912,892 | B2* | 12/2014 | Davoodi | H04Q 9/00 340/10.1 |
| 2002/0061131 | A1* | 5/2002 | Sawhney | G06T 15/205 382/154 |
| 2008/0158256 | A1* | 7/2008 | Russell | G06T 7/32 345/629 |
| 2011/0023132 | A1* | 1/2011 | Jelavic | G06F 17/30241 726/30 |
| 2013/0222115 | A1* | 8/2013 | Davoodi | H04Q 9/00 340/10.1 |
| 2017/0307746 | A1* | 10/2017 | Rohani | G01S 13/42 |

* cited by examiner

METHOD, SYSTEM AND COMPUTER PROGRAM FOR DECISION SUPPORT

CROSS-REFERENCE TO RELATED APPLICATIONS

This application is a National Stage of International patent application PCT/EP2014/076910, filed on Dec. 8, 2014, which claims priority to foreign European patent application No. EP 13198152.4, filed on Dec. 18, 2013, the disclosures of which are incorporated by reference in their entirety.

TECHNICAL FIELD

The invention generally relates to data processing and more particularly to decision support systems and methods for use in a battlefield environment.

BACKGROUND ART

To manage critical situations in a battlefield environment, accurate decision support tools can be used. In particular, decision support systems can be used in a battlefield environment to help an operator decide which battle actions to trigger, when threats are detected from targets in the surrounding environment of the operator. Such decision support tools can use in combination different types of sensors, actuators, user interfaces and data representations.

However, existing data representation methods used in such decision support systems are generally inefficient or under-efficient. For example, with the polar point of view (so-called "God's eye view"), an operator can fail to trigger pre-planned actions versus various incoming threats. Such a graphical representation can indeed be not adapted for available display or image acquisition means. In this kind of view, relative threat level of incoming targets may appear unclear, for example when targets approach from different directions. In addition, the associated data presentation space can be decreasing when threats are becoming closer.

SUMMARY OF THE INVENTION

In order to address these and other problems, there is provided a decision support method as described in independent claim 1, a computer program as defined in independent claim 8, and a system as defined in independent claim 10. Further embodiments are described in the dependent claims.

The decision support method provides a display of a wide variety of targets and threats information on any type of display, even limited in size, and can also provide recommendations about deterrent systems to use. Certain embodiments also provide ways to show a wide variety of information in one synthetic, exhaustive and dense overview without clutter.

The system can retrieve target information and deterrent system information from other systems. The system can collect, process and display the information to the user. The system can also suggest which deterrent systems to use, based on multiple criteria.

More generally, the system can lower the cognitive burden of users, e.g. soldiers. The system also enables more dynamic actions or reactions and improves certain defense and offensive actions from the data representation of reality captured and measured by sensors. As a result, the operators can increase their focus and attention on other and higher cognitive tasks, so as increase response times.

With such access to dense cognitive information, it is easier for an operator to make decisions. Also, the operator can make decisions faster, in particular in critical situations in a battlefield environment.

Embodiments of the invention advantageously can be used by police forces and other security/protection authorities (such as military forces).

Other advantages of the solution include the following:
Pre-plan action triggers can be visualized per target, in multiple ways;
Data representation matches constraints and limitations associated with existing display and camera perspective means;
Threat levels of incoming targets are easy to see, on one horizontal line;
The data presentation space can remain constant even when targets are coming closer;
The operator can be provided with means to enter detailed information about the defense layers that are needed and the deterrent systems which can be used by the methods and systems to suggest defensive actions.

Further advantages of the present invention will become clear to the skilled person upon examination of the drawings and detailed description. It is intended that any additional advantages be incorporated therein.

DESCRIPTION OF THE DRAWINGS

Embodiments of the present invention will now be described by way of example with reference to the accompanying drawings in which like references denote similar elements, and in which.

DETAILED DESCRIPTION OF THE INVENTION

Figure 1A:
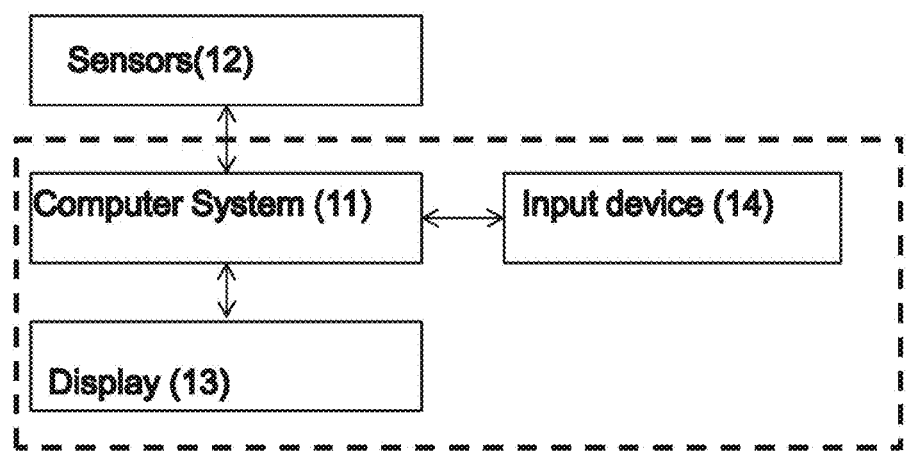
FIG. 1A illustrates the general architecture of a decision support system, according to certain embodiments of the invention.

Referring to FIG. 1A, there is provided a decision support system 10 for generating a real-time representation of a battle environment aggregating geographical information and strategic information in a way that allows a user in the battle field (also referred to thereinafter as an operator), such as a soldier, to make a fast and efficient decision, in any critical situation.

The decision support system 10 may be implemented in a computer system 12 mounted on any support which can be used by an operator in a battle environment, such as a military vehicle (tank, a submarine), a virtual or augmented reality helmet, a head mounted display (e.g. glasses), a wearable computer. The computer system 12 comprises a graphical user interface manager 120 for generating a decision support graphical interface on a display 13 connected to the computer system 12. More specifically the graphical user interface manager 120 is configured to generate a real time representation of the battle environment of the operator on the graphical interface. The computer system 12 may be also coupled to a set of sensors 12 arranged on the support or around the operator to detect surrounding information. The computer system 12 may be connected to input devices 14 (such as small keyboard, pointing device) to allow interactions of the operator 16 with the decision support system 10. The display 13 and/or the input devices 14 may be part of the computing system 12.

Figure 1B:
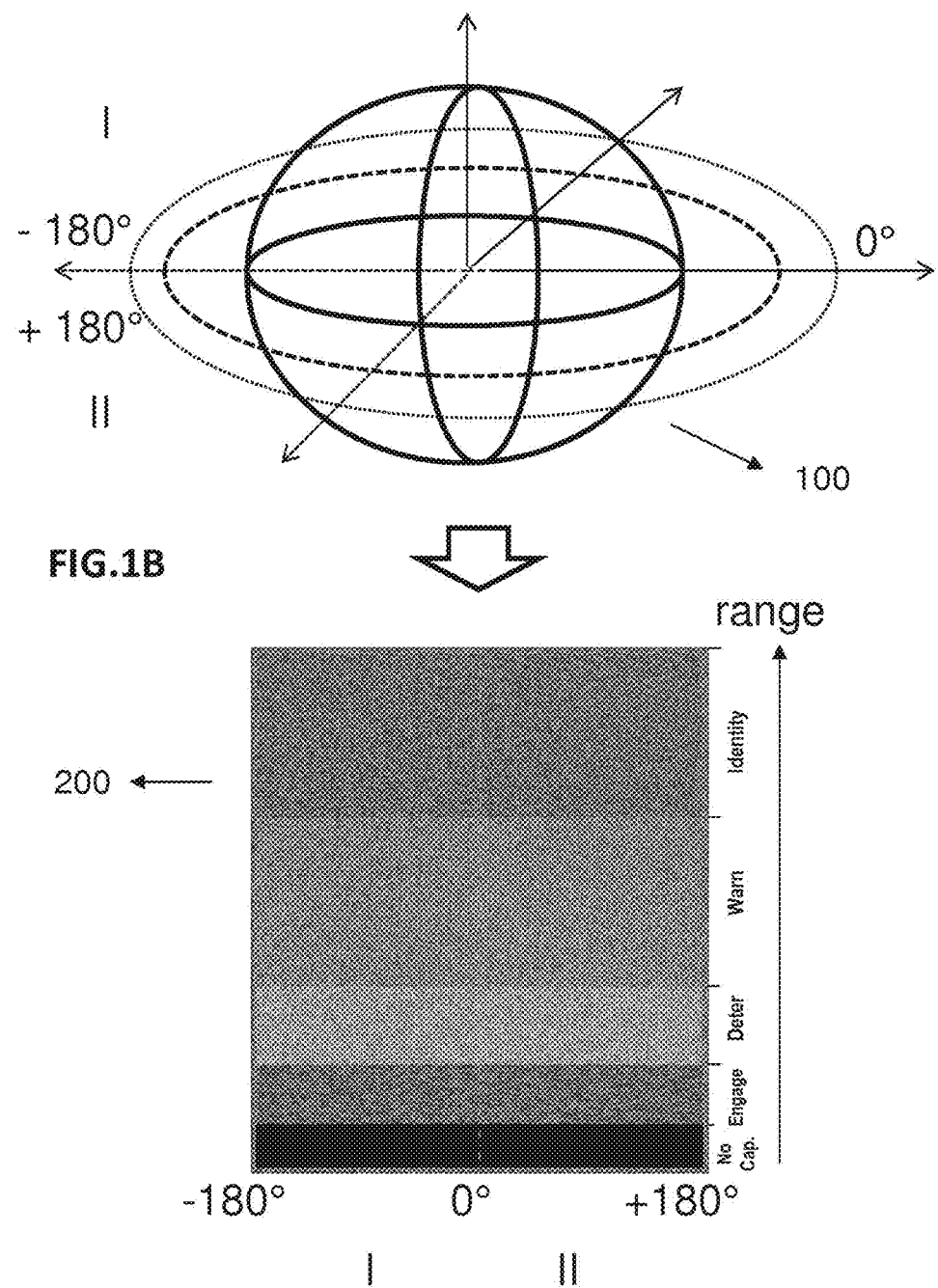
FIG. 1B illustrates the mapping of the spherical environment of the operator to a rectangular tactical representation.

Referring to FIG. 1B, the decision support system 10 is configured to map the spherical environment 100 of the operator to a rectangular tactical representation 200 generated on the graphical interface of the decision support tool interface. The operator may view such representation on the display 13 and trigger deterrent actions with respect to targets directly or indirectly. FIG. 1B more specifically shows the mapping between the spherical environment 100 of the operator and the rectangular tactical representation 200.

As shown in FIG. 1, the representation 200 comprises a set of defense layers of static or dynamic size (or "sub segments") corresponding to real layers of the spherical environment surrounding the operator.

According to one aspect of the invention, the decision support system 10 leverages a bearing-range rectangle for the representation of data. The middle of the rectangle represents the center line of the own position of the user or of the operator (for instance on a ship). From this center, the display shows 180 degrees to the left and 180 degrees to the right. Using this method the whole 360 degrees field of view is translated and mapped into a rectangle, suitable for display.

Such display presents several advantages. The data presentation space remains constant, even when targets come close. This type of representation matches with commercialized visual and camera perspectives.

The environment of the operator is mapped onto a substantially rectangular geometry.

Figure 2:
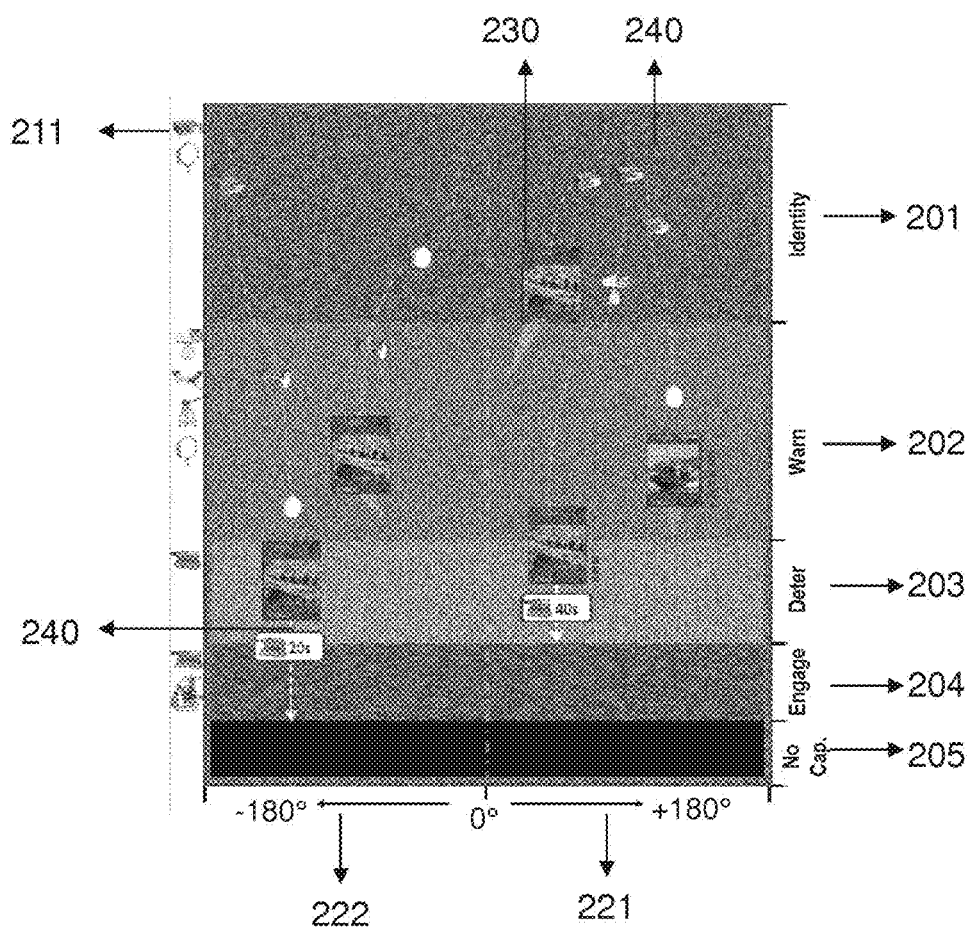
FIG. 2 shows the segmentation of the rectangular tactical representation into reconfigurable sub-segments.

FIG. 2 details the decision support graphical interface including a representation 200 of the surrounding environment of the operator. The graphical user interface manager is configured to generate not only a representation of the physical environment of the operator but also a superposed representation of the different threatening entities surrounding the operator. The spatial representation is split in different layers, such as 201, 202, 203, 204, 205, depending on the level of threat that is associated with each layer (referred to as "defense layer").

In certain embodiments, the decision support system 10 may generate an aggregated representation of the following elements: the defense layers (201, 202, 203, 204, 205), visual information (e.g. 230) related to adverse entities (such as an icon or an image or a video of a threatening or ally entity), available subsystems (not shown), chosen/suggested (tactical) actions (not shown), threat levels which can correspond to the defense layers, trajectory history information related to the entities progression in the battle field environments 240 and/or history information to battle related systems or actions.

The defense layers (for example 201, 202, 203, 204, 205) are configured to aid the user in the decision process. The defense layers shown in the exemplary figure are associated respectively with different categories of actions that can be triggered with respect to the entities located in this layer:

an "Identify" layer 201: if an entity is located in the Identify layer 201, identify actions can be triggered to know more about an entity;

a "Warn" layer 202: if an entity is located in the Warn layer 202, warning and advising actions can be triggered to warn or advise the entity to reverse direction;

a "Deter" layer 203: if an entity is located in the "Deter" layer 203, deterring actions can be triggered towards the entity such as firing a warning shot or inform an entity that it is getting too close;

an "Engage" layer 204: if an entity is located in the "Engage" layer 204, engaging actions, such as using lethal force, can be triggered to engage the entity;

a "No Capability" layer 205: if an entity is located in the "No Capability" layer 205, no action can be triggered toward the entity as such layer corresponds to the space around the location that is protected and in which the available systems are unable to execute.

The decision support system and method are not limited to such association between the defense layers and action categories. In particular, different action categories may be associated with the layers, depending on the application of the invention, and the battle environment.

Accordingly, an operator can easily and fastly make a decision as regard a threatening entity depending on the position of the entity with respect to the different defense layers.

Noticeably, defense layers have a "begin" and "end" distance range. For different situations (sea/Port), different ranges may apply. The ranges can be predefined and static. Alternatively, in one embodiment, the ranges can dynamically vary over time, depending of tactical scenarios and/or threat levels and/or risk mitigation levels and/or enemy entities capabilities and/or offensive/defensive own means.

The user or operator can use the decision support system 10 to obtain simultaneously local and tactile information about the surrounding threats. The defense layers represented in the graphical interface of the operator correspond to successive circular areas around the position of the operator. In one embodiment, the battlefield topology may be taken into account to refine and modulate the representation topology (for example, a hill or a river can imply different movement constraints for a tank for example). As a result of such a pre-processing step, the representation 200 is mapped from reality captured by sensors into a tactical representation view integrating a set of predefined parameters.

In some embodiments, the decision support system 10 can request and/or receive additional information from the user such as the following types of information: name, begin range, end range. The range boundaries of the different defense layers can be defined previously from such user inputs. Alternatively, the range boundaries of the defense layers can be adjusted dynamically, based on sensors' data. Any number of layers can be created.

The visual elements 230 correspond to the entities in the surrounding environment of the operator (possible targets) which can be displayed in the tactical representation. A visual element 230 can be a snapshot (photo) or display live video from a camera or any other visual. The visual element 230 associated with an entity may be also a still image taken from a camera. The decision support system 10 can be coupled to a connected camera system to automatically acquire an image. Alternatively, the user can manually set an image. The visual element 230 can also be a real-time video, showing in detail the behavior of the target. A synthetic representation of the object, taking the aspect angle into account may be used also.

The decision support system 10 may further generate a display of a set of additional visual elements 211 representing deterrent system(s) 211 in association with each defense layer (201, 202, 203, 204, 205). As used herein, a deterrent system represents an actable defensive or offensive system, which can be lethal or non lethal, and which can be used to repel or deter targets. Examples of such systems include laser guns, flash lights, automated machine guns, dazzling lasers, etc. Accordingly, for each adverse entity located in a given defense layer, the operator can immediately assess the possible deterrent systems that can be triggered toward the adverse entity in the battle environment. The operator may thus trigger directly or indirectly a deterrent system adapted to the location of the entity. A set of interfaces may be used to handle the real deterrent systems. In the representation 200, the visual element representing each deterrent system may be an image (for example representing the deterrent system) and/or a name. The visual representation of the deterrent system may be associated with additional information such as the effective range and properties of the deterrent system, such as the types of force (lethal/non lethal) it can output. The decision support system may collect information about the available deterrent systems from various sources such as information files. The decision support system 10 may further calculate if the range of the deterrent system falls within the range of the Defense Layer and warns the user if the range does not overlap. The decision support system may also take into account the probability of effect when calculating the best deterrent system.

For each entity 230 forming a possible target, a history line 240 can be plotted in the tactical representation to trace the movement of the entity and indicate its direction (for example with an arrow). The user/operator can thus know at any time where the entity is, from where it originated and also possible movements (by anticipation, for example due to field topology or conditions). On the history line 240, an icon can be placed to indicate that a deterrent system has been used to act upon the entity. Such representation thus gives a concise summary of the actions the user/operator has chosen for a certain entity.

Likewise, for each entity, when a deterrent system is selected to act on a given entity or is suggested by the decision support system 10, a miniature can be displayed besides the entity, showing the selected deterrent system 211. The remaining time to engage can also be suggested and displayed. The overview can show for all—or for a subset of selected entities for example—how much time the user/operator has (in worst case scenario) and which subsystem will be the most effective for the current Defense layer.

The decision support system 10 further enables the user to adapt the representation by predefining the Defense Layers and Deterrent systems on which the decision support system 10 is to be based.

The decision support system 10 can retrieve information about the entities (target data) from various sensors (such as Radars, EO). Such information may contain Target type, location, speed, direction. The decision support system 10 is configured to connect to different data sources to retrieve the needed target data.

In addition to the defense layers, some additional information can be displayed.

The decision support system 10 can further generate a representation of additional data in the graphical interface 200.

Figure 3:
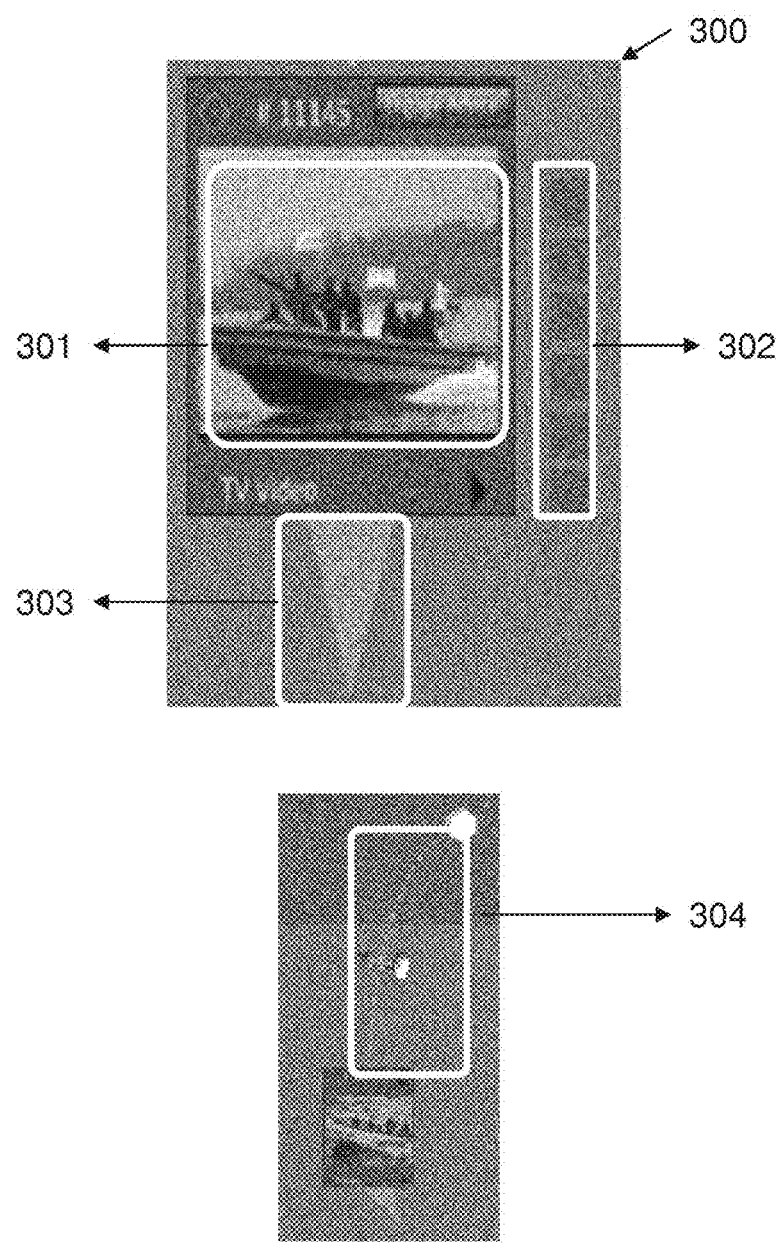
FIG. 3 illustrates the fusion of information sources in overlay on the tactical representation and example of indications of available actuation means.

FIG. 3 shows examples of additional data that can be displayed in the graphical user interface 200.

Besides location and direction data, the decision support system 10 can generate a representation of additional visual data 301 (video/snapshots) if available, as shown in FIG. 3. The system can be connected to a camera or video systems to retrieve this type of data. The system can correlate the metadata of the visual with the already present target data.

A threat level 302 can be further determined and displayed by the decision support system 10. The system can take into account multiple criteria such as range, speed, behavior, closest point of approach, to determine the threat level. In FIG. 3, one threat level is calculated and shown to the user. The system can calculate the threat level for each threat. For example, this threat level can be calculated by Multi Criteria Decision Making (MCDM) functionality, for example leveraging weighted criteria, such as range, speed, behavior, etc. in order to determine how threatening a target is.

In addition, the decision support system 10 can generate a representation 303 of the speed of the target, for example in the form of a cone 303. The form of the cone may be proportional to the speed of the target. For example, for low speed(s), the cone may be small and for high speed, the cone may be large and long.

The decision support system 10 can further maintain a history of the track 304 associated with an entity. The history may comprise a set of location points, together with a set of deterrent system selections. This history may be displayed to the user in the view 200 with a dot line and icons representing deterrent systems previously selected. Accordingly, the user is able to see where a target has been, and when/where a deterrent system was selected.

Information about deterrent systems can be obtained from the real corresponding systems or a description files.

The system can store the location history for a plurality or all targets within the range. The decision support system 10 may also store the history of certain actions previously selected.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. For example the decision support system and method may generate a representation of tactical recommendations in association with each entity depending on its position with respect to the different layers, and/or with respect to the particular position of the entity inside the layer where it is located.

Further, particular limitations, and/or embodiment enhancements described herein, which may have particular advantages to a particular application need not be used for all applications. Also, not all limitations need be implemented in methods, systems and/or apparatus including one or more concepts of the present invention.

Embodiments of the present invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The invention claimed is:

1. A decision support method implemented in a computer system and for use by an operator surrounded by adverse entities in a spherical physical environment, the method comprising:
generating a layered representation of the spherical physical environment surrounding the computer system based upon sensor information by mapping the spherical physical environment of the computer system into a geometrical representation that is configured for display on a screen, said layered representation being segmented into a plurality of layers having respective sizes, each layer being associated with a respective category of tactical actions, said layered representation further including at least one visual element representing at least one of the adverse entities in the surrounding spherical physical environment of the computer system, the at least one visual element being represented so as to be superposed with a given layer of the plurality of layers, the given layer being associated with a range boundary that is dynamically adjusted from data of one or more sensor.

2. The method of claim 1, wherein the range boundary is associated with a begin range and an end range.

3. The method of claim 1, further comprising generating a representation of a set of actable deterrent systems in association with each layer.

4. The method of claim 1, further comprising generating a representation of the trajectory history information for each entity over the different layers.

5. The method of claim 1, further comprising generating a representation of tactical recommendations in association with each entity depending on the position of the entity with respect to the layers.

6. The method of claim 1, further comprising receiving one or more operator selections to trigger actuation of one or more deterrent subsystems.

7. A non-transitory computer readable medium comprising instructions that when executed by a computer system cause the computer system to automatically perform a decision support method for use by an operator surrounded by adverse entities in a spherical physical environment, the method comprising:
generating a layered representation of the spherical physical environment surrounding the computer system based upon sensor information by mapping the spherical physical environment of the computer system into a geometrical representation that is configured for display on a screen, said layered representation being segmented into a plurality of layers having respective sizes, each layer being associated with a respective category of tactical actions, said layered representation further including at least one visual element representing at least one of the adverse entities in the surrounding spherical physical environment of the computer system, the at least one visual element being represented so as to be superposed with a given layer of the plurality of layers, the given layer being associated with a range boundary that is dynamically adjusted from data of one or more sensor.

8. A decision support system implemented in a computer system and for use by an operator surrounded by adverse entities in a spherical physical environment, the system comprising:
a graphical user interface manager for generating a layered representation of the spherical physical environment surrounding the computer system, based upon sensor information, on a graphical user interface by mapping the spherical physical environment of the computer system into a geometrical representation configured for display, said layered representation being segmented into a plurality of layers having respective sizes, each layer being associated with a respective category of tactical actions, said layered representation further including at least one visual element representing at least one of the adverse entities in the surrounding spherical physical environment of the computer system, the at least one visual element being represented so as to be superposed with a given layer of the plurality of layers, the given layer being associated with a range boundary that is dynamically adjusted from data of one or more sensor.

* * * * *